INVENTOR.
HARRY C. RIBLETT, JR.
BY
Meyer, Tilberry & Body

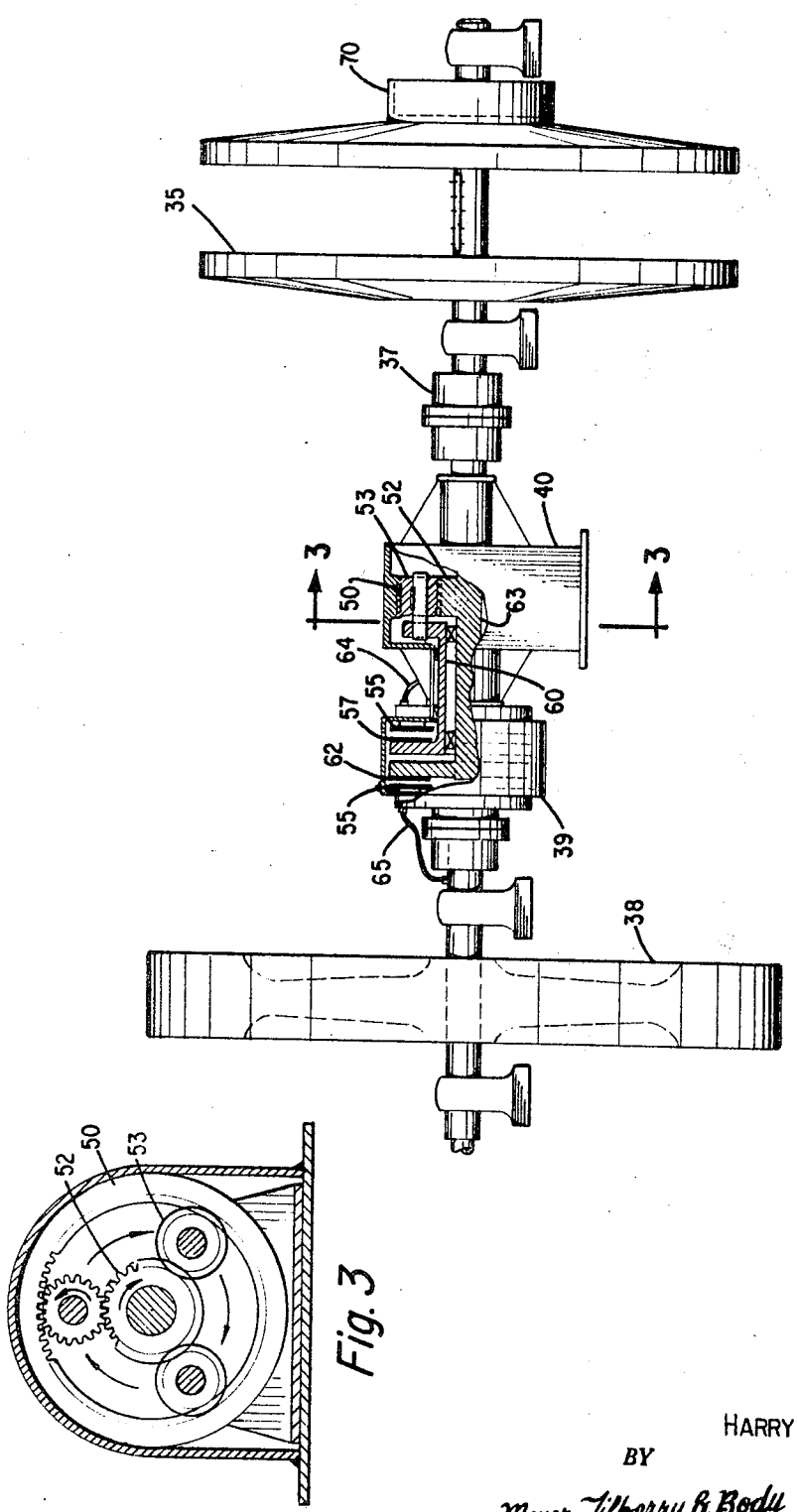

United States Patent Office 3,446,461
Patented May 27, 1969

3,446,461
AIRCRAFT LAUNCHING SYSTEM
Harry C. Riblett, Jr. Wilmington, Del., assignor to
E. W. Bliss Company, Canton, Ohio, a corporation of Delaware
Filed Oct. 28, 1966, Ser. No. 590,284
Int. Cl. B64f *1/06*
U.S. Cl. 244—63          4 Claims

ABSTRACT OF THE DISCLOSURE

A device for launching aircraft from a standing stop on a runway includes a variable speed transmission between a flywheel and a tape reel. The variable speed transmission includes two drive trains with one being a substantially lower speed reduction than the other. The low speed reduction drive train is connected to initiate movement of the aircraft. After the aircraft has attained a certain speed or moved a certain distance the low speed drive train is disengaged and the other drive train engaged to bring the aircraft to final launching speed.

---

This invention pertains to the art of launching aircraft from a limited take-off space such as where the available runway is too short for the weight to power ratio of the aircraft.

The present invention will be described with particular reference to a land based launching system of the type employing a continuously rotating flywheel as an energy storage device. During launching the energy of the flywheel is transmitted to the aircraft which is poised on the runway. As the aircraft accelerates, the flywheel slows down. After launching, the rotational speed of the flywheel is restored by a separate power source.

Heretofore, in flywheel launching systems a major problem has been in delivering higher peak horsepower from the flywheel to the aircraft. For heavier aircraft, a massive flywheel is required and a heavy duty clutch is used to reduce slippage. To offset this, it has been suggested that the aircraft be started down the runway under its own power with the flywheel being clutched in thereafter.

Schemes involving this technique generally employ a grabtype runway dolly which is put in motion by the flywheel and moves parallel to the path of launch of the aircraft. The only load the flywheel and clutch experience is that of pulling the dolly, the aircraft being propelled momentarily under its own power. As the dolly accelerates it overtakes the aircraft. The arrangement is such that the dolly engages with the aircraft. As both the dolly and aircraft reach the launching speed, the dolly separates and the latter becomes airborne. The flywheel drive is then clutched out and the dolly is braked to a stop. A retraction engine pulls the dolly back to the ready or battery position in preparation for the next launch.

Perhaps the main disadvantage of this system is the necessity of having the aircraft in motion before engagement with the launching gear.

Another problem is in obtaining the required acceleration of the aircraft. As the flywheel slows down, the acceleration of the aircraft must increase. Thus the rotational speed of the flywheel must be great at the moment of clutch engagement in order to compensate for the rapid loss of power which occurs thereafter. One proposal to meet this problem has been to employ a reel wound launching tape. The tape is coiled on a reel driven by the flywheel and transmits the rotational energy of the flywheel to the aircraft. As the tape wraps around the reel the acceleration of the aircraft is maintained although the flywheel is slowing down. Ideally, the tape tension should be substantially constant throughout the launch period, and prior art schemes have evolved such things as tapering the tape so that the last portion to be wound on the reel is thicker than the first portion, winding a secondary tape into the coil of the launching tape to increase the coil diameter or putting cleats on the launching tape to obtain the same effect.

Experience has shown that even with schemes such as these, the energy loss due to clutch slippage at the moment of flywheel engagement is extremely high so that the need for a heavy duty clutch remains the same while demands for further increases in the size of the flywheel are aggravating the problem.

These and other difficulties are overcome with the present invention which contemplates a flywheel launching system employing a smaller flywheel requiring less clutch capacity although launching is initiated with the aircraft at a dead stop.

In accordance with the invention, a flywheel and tape launching system comprises a flywheel, a reel driven thereby having a tape which is wound thereon in ever increasing convolutions during the launch and a variable speed transmission being engageable to connect the flywheel to the reel through one drive having a lower gear ratio than another drive, the drives being alternately engageable during the launch.

Accordingly, it is among the objects of the invention to provide a flywheel-tape launching system capable of launching an aircraft from a dead stop.

Another object is the provision of a variable speed transmission between the flywheel and reel capable of performing a power shift while under load so that the reel has a variable launching speed.

A further object is to obtain quick clutch lockup, initially and during the power stroke, with a minimum of clutch slippage.

Still another object of the invention is to obtain higher launching speeds due to the ability of the systems to lug the flywheel down to a lower final r.p.m. before performance deteriorates than would otherwise be possible thus enabling a smaller flywheel to be used.

These and other objects will be appreciated by referring to the following description and drawings wherein:

FIGURE 2 is a side view of the flywheel-tape launcher shown in FIGURE 1;

FIGURE 3 is exemplary of a planetary transmission of the type which may be utilized with the invention taken approximately along line 3—3 of FIGURE 2;

Figure 1:
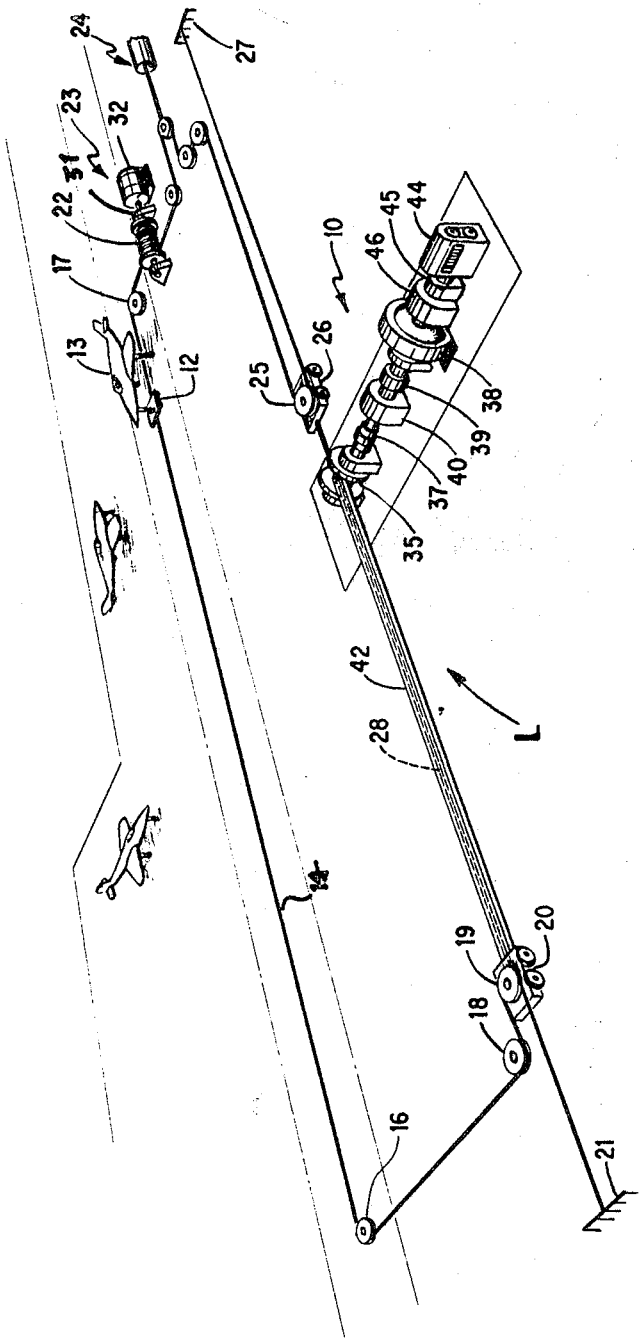
FIGURE 1 is a schematic layout of an aircraft launching system employing a flywheel-tape launcher according to the invention.

Referring now to the drawings wherein the showings are for the purposes of illustrating a preferred embodiment of the invention only and are not for the purpose of limiting same, FIGURE 1 shows a layout of a launching system L which employs a flywheel-tape launcher 10.

The system L includes a runway dolly 12 which is releasably attached by any known means to an aircraft 13 poised on the runway. The dolly 12 is towed down the runway by a cable 14 which passes around 90 degree sheaves 16, 17 at each end of the runway positioned beyond the take-off space required for launching the aircraft 13. The cable 14 passes perpendicular to the runway around a fixed sheave 18 and then around sheave 19 carried on movable truck 20 which travels parallel to the runway. The far end of cable 14 is affixed to an anchor depicted at 21. Behind the aircraft 13, the cable 14 passes around sheave 17, a drum 22 of a dolly arrestor and retract drive assembly 23, through a tension compensator assembly 24, sheave 25 mounted on a movable sheave truck 26 and finally anchoring at 27. The traveling sheave trucks 20, 26 are interconnected by a cable 28 sized merely to hold pretension of the cable loop. The rotation of drum 22 around which cable 14 passes after leaving sheave 17 is controlled by a multiple disc friction brake 31 adapted to be energized immediately following the launch stroke thus applying a retarding force to the cable 14 and dolly 12. After a launching, a retraction motor 32 of the assembly 23 drives the drum 22 to recycle the system and return the dolly 12 to the ready or battery position as shown in FIGURE 1.

Referring now to the flywheel-tape launcher 10, a tape reel 35 is mounted on a shaft 37 which is turned by a flywheel 38. A tape 42 is connected at one end to the hub of reel 35 and at the other end to the movable sheave truck 20. The tape preferably is woven of high strength synthetic yarns such as nylon and is considerably wider than it is thick so as to be coilable upon itself in ever increasing convolutions as the reel 35 turns. For details of the construction of such a tape reference is made to U.S. Patent 3,142,458, issued July 20, 1964 also assigned to the assignee of the present invention.

The flywheel 38 is brought up to speed in preparation for a launch by any known means such as engine 44 which is drivingly coupled thereto through a clutch 45 and transmission 46. The components 44, 45, 46 are capable of bringing the flywheel 38 up to its launching speed, say in the order of 125 r.p.s., between launches to restore the speed lost during launch.

It should be appreciated that the aircraft 13 is at a dead stop while the flywheel is at maximum speed when the reel 35 commences to rotate. Consequently the inertia of the system felt by the reel at the start of a launch cycle is that of the aircraft 13, dolly 12, cable 14 and tape 42 as well as other incidental loads of the system.

In accordance with the invention, the flywheel 38 drives the reel 35 at first a low speed and then power shifts to a higher speed through a dual range transmission 40 coupled to the flywheel by a multiple disc friction clutch 39.

Referring to FIGURES 2 and 3, the dual range transmission 40 may be in the form of a planetary gear set including a ring gear 50, a sun gear 52 and planet gears 53 which are on a spider drivingly connected with shaft 37 such that when the planet gears 53 are driven by the flywheel through clutch 62 and sun gear 52, a gear reduction occurs to the shaft 37 upon which the reel 35 is mounted. Alternatively, when the planet gears 53 are directly driven through clutch 57 and clutch 62 is disengaged, shaft 37 is in direct 1:1 drive relationship with the flywheel. The clutching of the flywheel 38 to either the planet gears 53 or sun gear 52 is accomplished through the hydraulically actuated friction clutch assembly 39 having clutch discs 55 which rotate with the clutch housing which is driven by the flywheel. High speed clutch discs 57 are carried by a shaft 60 drivingly coupled with the spider of planet gears 53. Correspondingly, low speed clutch discs 62 are driven on the shaft 63 which is drivingly coupled to the sun gear 52. Suitable hydraulic actuators (not shown) are arranged to alternately actuate the clutch discs 57, 62 through hydraulic lines 64, 65 in accordance with the desired shift point.

Figure 4:
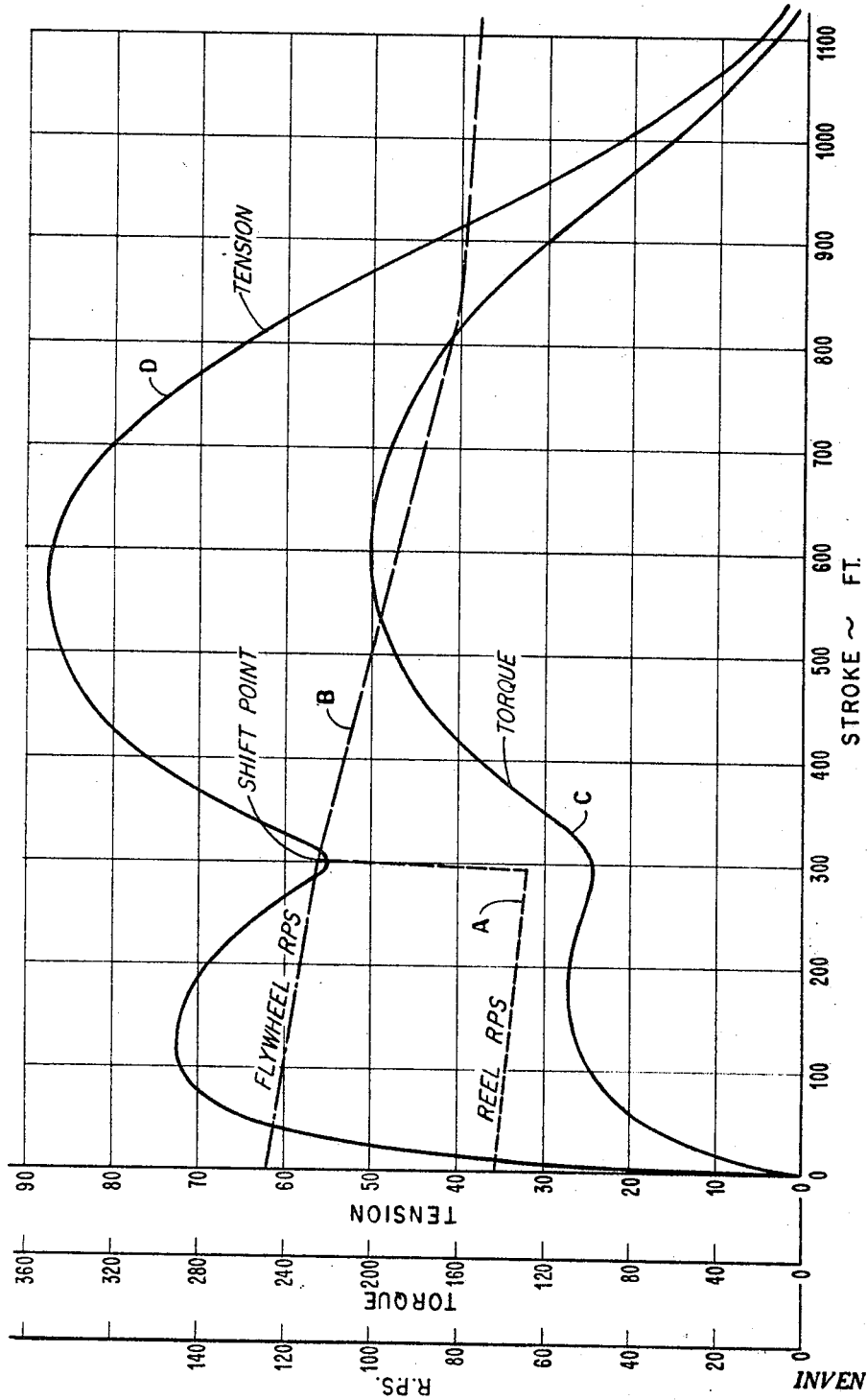
FIGURE 4 is a plot of flywheel and reel velocity, torque and tape tension versus the stroke distance for a flywheel-tape launching system utilizing the invention.

Referring now to FIGURE 4 are exemplary plot of flywheel and reel speed torque and tension versus stroke distance in feet is drawn for the preferred embodiment of the invention as shown in FIGURES 1 to 3. Reel speed in r.p.s. is represented by the line A, flywheel speed in r.p.s. by line B, delivered torque by line C and tape tension by line D. Stroke distance is the distance in feet the aircraft 13 has traveled from the position shown in FIGURE 1 at the point reference is made to the curves. In operation, initially both clutch discs 57, 62 are disengaged and the flywheel 38 is brought up to speed by the engine 44. With the flywheel 38 at rated speed and the launching tape fully extended as shown in FIGURE 1, the low speed clutch discs 62 are engaged. This drives planet gears 53 through sun gear 52 of the planetary transmission 40 for applying torque to the tape reel 35 at a reduced gear ratio. During this period the torque and tension curves follow approximate traces as shown by curves C and D for the first 300 feet of runout.

The reel is initially accelerated to about 70 r.p.s. and thereafter slows down slightly as the flywheel speed drops from about 125 r.p.s. to approximately 115 r.p.s. at the shift point at the 300 foot distance. When the aircraft has traveled approximately a quarter of the power stroke, at the 300 foot distance, low speed clutch discs 62 are disengaged and high speed clutch discs 57 are engaged. This locks in the power train of the planetary transmission 40 from the flywheel 38 through the spider of planet gears 53 and torque is applied to the reel shaft 37 at a 1:1 ratio for the balance of the power stroke. The change in gear ratio is evident from curve A which illustrates the rapid increase in reel r.p.s. bringing it up to flywheel speed as represented by curve B. Correspondingly, torque and tape tension as represented by curves C and D are increasing more or less uniformly. When the aircraft reaches take-off speed the high speed clutch discs 57 are disengaged and the reel brake 70 is engaged to stop the reel. At the same time, multiple disc brake 31 (FIGURE 1) is engaged to stop the launch dolly 12. At this point the movable sheave trucks 20, 26 will have reversed positions. To recycle the system, the motor 32 is engaged to return the launch dolly 12 restoring the system to that position shown in FIGURE 1. In the meantime engine 44 is clutched in to bring the flywheel 38 back up to speed in readiness for the next launch cycle.

According to the invention, a smaller flywheel can be used which results in much longer clutch life. Clutch life expectancy is about ten times greater than in prior art devices. Another advantage is the control flexibility offered by selection of the reduction gear ratio and the shift point. It is thus possible to achieve a flatter tape tension (tow load history) thus minimizing peak-tow forces on the aircraft being launched.

Power shift transmission 40 provides the ability to "lug down" the flywheel 38 to a lower final r.p.s. before performance deteriorates than would be possible with a straight 1:1 clutch system. Most importantly, transmission 40 makes unnecessary the prior art acceleration schemes described hereinbefore since, in the invention, the gear ratio can be selected which will deliver the required acceleration.

Having thus described my invention, I claim:

1. A device for launching an aircraft from a runway comprising:

(a) a freely rotatable flywheel, (b) motor means drivingly connected with said flywheel, (c) movable connecting means adapted to be attached to an aircraft, (d) a rotatable tape reel, (e) an elongated flat tape having first and second ends, (f) said first end of said tape being secured to said reel, (g) said second end of said tape being secured to said connecting means, (h) said tape being wound on said reel in ever increasing convolutions to move said second end toward said reel when said reel is rotated, (i) variable speed transmission means selectively drivingly connecting said flywheel with said reel, (j) said transmission means having at least first and second drive trains, (k) said first drive train being a lower speed reduction than said second drive train, (l) means for connecting said flywheel with said reel through said first drive train to initiate rotation of said reel, and (m) means for disconnecting said first drive train and connecting said flywheel with said reel through said second drive train when said reel has reached a predetermined speed, (n) whereby said connecting means is accelerated at a first low rate during the initial stage of a launching cycle and at a second higher rate during the final stage of a launching cycle to minimize peak towing forces on an aircraft.

2. The device of claim 1 wherein said transmission means is shiftable under load to disengage said first drive train and engage said second drive train whereby said reel is substantially constantly driven and loses substantially no speed in changing from said first to said second drive train.

3. The device of claim 1 wherein said flywheel, motor reel and transmission are mounted adjacent one side of an elongated aircraft runway and said tape extends substantially parallel to said runway from said reel to said connecting means.

4. The device of claim 1 and further including braking means for stopping rotation of said reel and power means for unwinding said tape from said reel and moving said connecting means away from said reel.

References Cited

UNITED STATES PATENTS

| | | | |
|---|---|---|---|
| 2,803,151 | 8/1957 | Clerk | 74—751 |
| 2,935,899 | 5/1960 | Nallinger | 74—730 |
| 2,379,267 | 6/1945 | Wilson | 244—63 |
| 2,523,314 | 9/1950 | Maxson et al. | 244—63 |
| 2,926,872 | 3/1960 | Fulton et al. | 244—63 |

FOREIGN PATENTS

| | | |
|---|---|---|
| 697,648 | 10/1940 | Germany. |
| 894,545 | 3/1944 | France. |
| 825,941 | 12/1959 | Great Britain. |

MILTON BUCHLER, *Primary Examiner.*

P. E. SAUBERER, *Assistant Examiner.*

U.S. Cl. X.R.

74—751